UNITED STATES PATENT OFFICE.

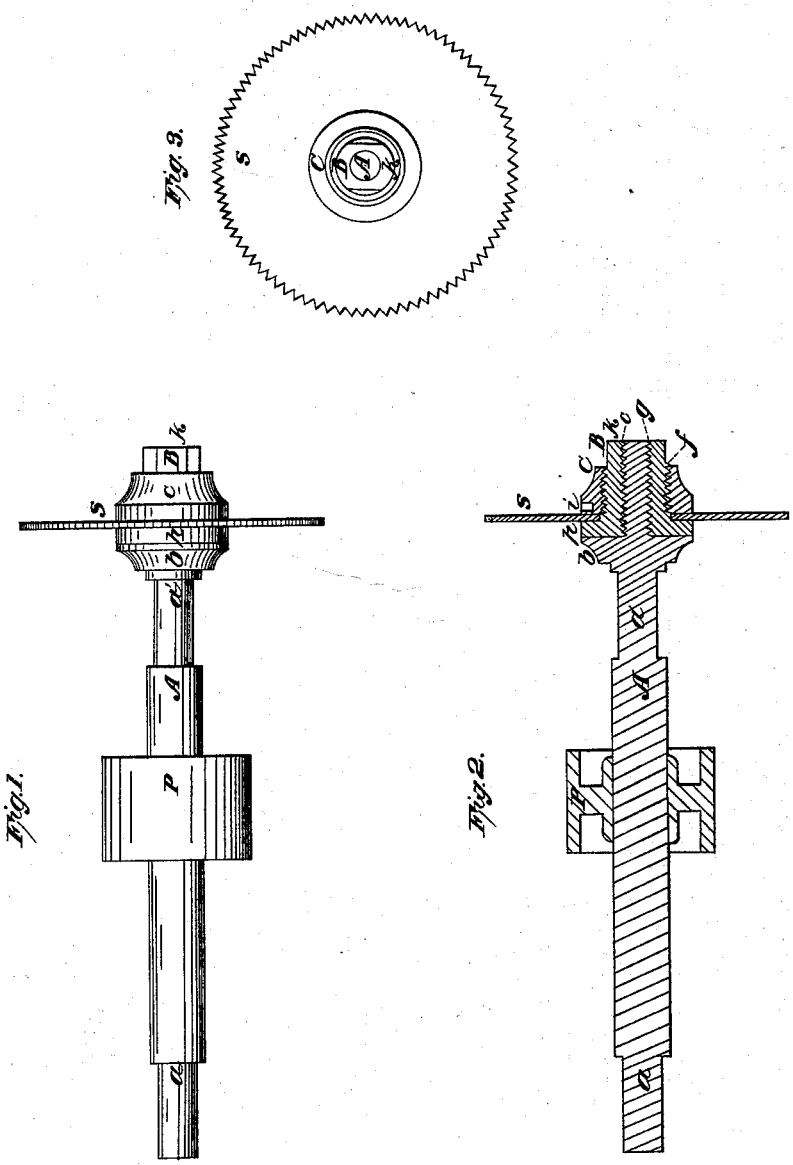

W. R. CLOSE, OF BANGOR, MAINE, ASSIGNOR TO HIMSELF AND G. W. MERRELL, OF SAME PLACE.

IMPROVEMENT IN HANGING CIRCULAR SAWS.

Specification forming part of Letters Patent No. 47,597, dated May 2, 1865.

*To all whom it may concern:*

Be it known that I, W. R. CLOSE, of Bangor, in the county of Penobscot and State of Maine, have made a new and useful Invention for Centering a Circular Saw or Applying it to an Arbor; and I do hereby declare the same to be fully described in the following specification, and represented in the accompanying drawings, of which—

Figure 1 is a side elevation; Fig. 2, a longitudinal section, and Fig. 3 an end view, of a circular saw and its arbor, provided with my improvement, the purpose of which is not only to avoid the use of bolt and bolt-holes in the saw and its arbor-connections, but to enable the saw to be readily removed from the arbor and properly centered relatively thereto, as circumstances may require.

With my invention there is little danger of the saw becoming heated and warped by heat transmitted from the arbor-journal.

In the drawings, A denotes the arbor; $a\ a'$, its journals; P its pulley, and S the circular saw. The arbor is constructed with a bearing-head, $b$, and also with a male screw, $c$, projecting therefrom in the axis of the arbor produced.

A hub or collar, B, having a shoulder, $h$, and a male screw, $f$, and also a female screw, $g$, to fit the screw $c$, all arranged as represented, receives the saw S, or in other words is extended through the eye of the saw. A nut, C, is screwed concentrically on the screw of the part B and serves to clamp the saw S closely against the shoulder $h$, such nut C being made with a recess, $i$, for the reception of a spanner, when employed either for screwing up or unscrewing the nut.

The end or projecting portion $k$ of the hub should be made polygonal in its transverse section, in order to fit into a wrench when applied to it for the purpose of rotating the hub B on the screw $c$.

With my invention, the disengagement of the saw from its hub B, as well as the removal of the latter from the arbor, can be easily effected. While in connection with the hub the saw remains duly centered with respect to the axis thereof, such axis when the hub is in place on the arbor being coincident with the axis of the latter. Thus it will be seen that the removal of the saw from the arbor for the purpose of being filed will not affect the proper centering of it, as when next applied to the arbor the saw will assume its proper position concentric with the axis of the arbor.

I claim—

As my improvement or invention for centering a circular saw or applying it to its arbor, the combination described, the same consisting of the head $b$, the screw $c$, the nut C, and the hub B with its screw $f$ and the shoulder $h$, such nut C and hub B being provided with the recess $i$ and the polygonal head $k$, or their equivalents, and the whole being arranged substantially as specified.

W. R. CLOSE.

Witnesses:
A. L. SIMPSON,
H. L. MITCHELL.